May 11, 1965 H. F. RIETH 3,183,419
ELECTRICAL CAPACITOR HAVING AN INTERNAL RIB STRUCTURE
Filed Feb. 1, 1960 3 Sheets-Sheet 1

INVENTOR:
Harold F. Rieth

Smyth & Roston
Attorneys

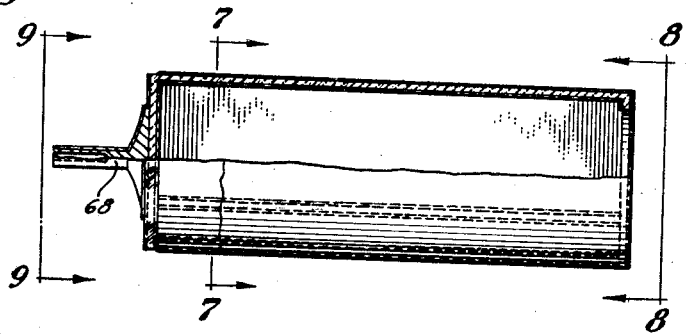
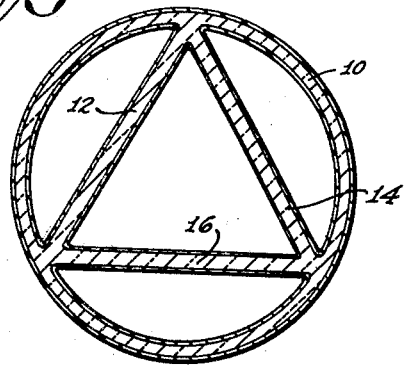
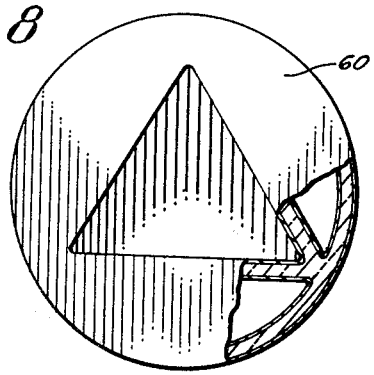
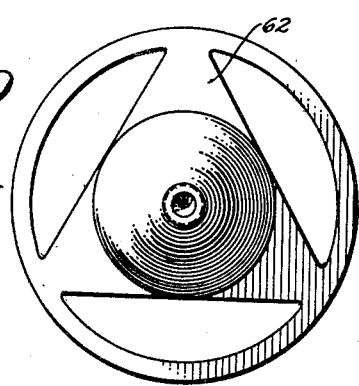
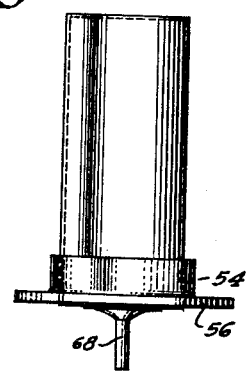
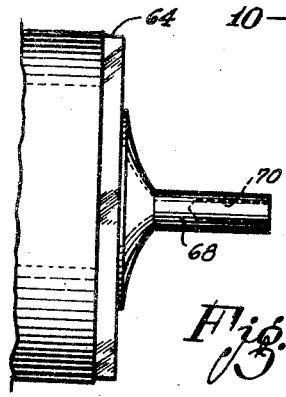

May 11, 1965 H. F. RIETH 3,183,419
ELECTRICAL CAPACITOR HAVING AN INTERNAL RIB STRUCTURE
Filed Feb. 1, 1960 3 Sheets-Sheet 3
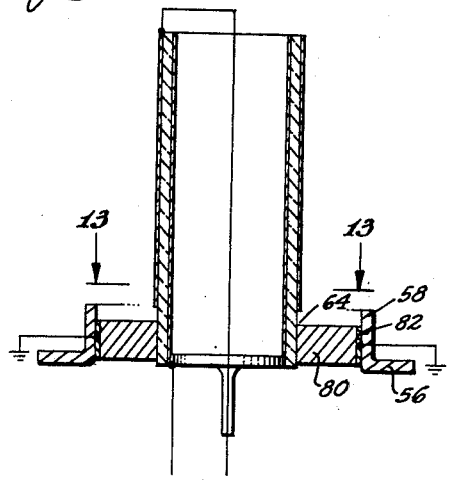
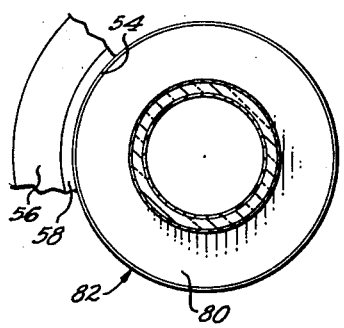
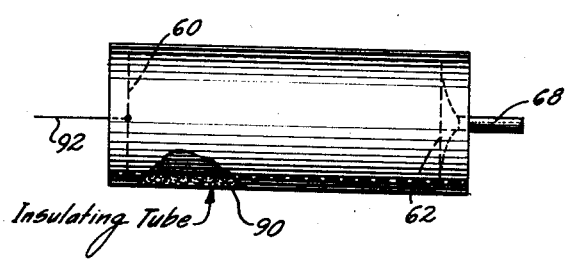
INVENTOR.
Harold F. Rieth
By Smyth & Roston
Attorneys

United States Patent Office

3,183,419
Patented May 11, 1965

3,183,419
ELECTRICAL CAPACITOR HAVING AN INTERNAL RIB STRUCTURE
Harold F. Rieth, Pasadena, Calif., assignor to Packard-Bell Electronics Corporation, Los Angeles, Calif.
Filed Feb. 1, 1960, Ser. No. 6,063
15 Claims. (Cl. 317—242)

This application is a continuation-in-part of co-pending application Serial No. 734,700, filed May 12, 1958, now abandoned, by me for "Electrical Capacitor."

This invention relates to electrical capacitors and more particularly to electrical capacitors formed in part from a suitable dielectric material such as a ceramic but including the advantages of the paper type of capacitors. The invention also relates to methods of forming such capacitors.

Capacitors are used as one of the fundamental elements in all types of electrical and electronic circuits. The capacitors may be made in various ways in accordance with the parameters required of the capacitors. For example, the capacitors may be made by disposing one or more thin strips of dielectric paper between two strips of conductive foil such as tin or copper and by rolling these strips into a compact bundle. These capacitors are known as "paper condensers" and are advantageous in that they provide a large capacity in a small volume. The disadvantage of paper condensers is that they have fairly high electrical losses. These losses tend to increase with time and with moisture content because of deterioration in the characteristics of the paper under these conditions. These electrical losses limit the voltage capable of being applied to the condensers and the maximum frequencies a which the condensers can be used. Since many electronic circuits now employ either high voltages or high frequencies or both, the use of paper condensers has become somewhat limited.

Another type of condenser uses a dielectric material between two conductive plates. Originally mica was used as the di-electric material, but in the last several years ceramic has been used as the dielectric material instead of mica. These capacitors are generally designated as "ceramic condensers." They have the advantage of providing low losses in comparison to paper condensers and of withstanding high voltages. Since losses tend to increase with frequency, ceramic condensers are also used in circuits and systems operating at high frequencies. The disadvantage of ceramic condensers is that they occupy a greater space for a given value of capacitance than the space occupied by a paper condenser having the same value of capacitance. Ceramic condensers are also more expensive than paper condensers.

Various attempts have been made to combine the advantages of paper and ceramic condensers so that a resultant capacitor could be contained which would have none of the disadvantages of either the paper or ceramic condensers. One obvious expedient, of course, would be to roll the ceramic and a pair of electrical conductors just as paper and a pair of electrical conductors are rolled to produce the paper condensers. However, the characteristics of ceramic have prevented the ceramic from being easily rolled. By providing such an interleaved relationship in successive annular layers of the ceramic and the conductors, an increased value of capacitance could be obtained. These attempts as well as numerous other attempts have been made to combine the advantages of the ceramic and paper condensers but without any appreciable success.

This invention provides a capacitor which combines the advantages of both the paper condensers and the ceramic condensers. The invention includes a shell which is made from a dielectric material such as a ceramic and which is preferably annular. A plurality of ribs are disposed within the shell, preferably in integral relationship with the shell and with one another. The ribs are also preferably disposed in oblique relationship to one another to define an internal chamber such as a polygon and a plurality of pockets between the internal chamber and the shell.

In one embodiment of the invention, the external surface of the shell, the walls of the internal chamber and the walls of the pockets are coated with a conductive material so that the external surface, the internal chamber and the pockets remain in electrically isolated relationship to one another. The conductive coatings in the internal chamber and on the external surface of the shell are then electrically coupled to form a first plate of the condenser, and the conductive coatings in the pockets are also electrically coupled to one another to form the second plate of the condenser. Such coupling may be obtained by electrical clips or in any other suitable manner.

The capacitance constituting the invention has certain important advantages. By providing the internal chamber and electrically coupling this chamber to the external surface of the shell, the effective length of the first plate in the capacitance is considerably increased. Similarly, the effective length of the second plate in the condenser is considerably increased by providing a plurality of pockets between the internal chamber and the shell and by electrically coupling these pockets. Since the lengths of the first and second plates in the condenser are effectively increased, the capacitive value of the condenser is correspondingly increased. The capacitive value of the condenser is further increased because the thickness of the walls of the shell and the ribs can be decreased as a result of the bracing action provided by the ribs. The capacitive value is further increased in this manner since the value of a capacitance is inversely related to the distance between the plates of the capacitance.

In another emodiment of the invention, the shell and the ribs within the shell are provided in a manner similar to the first embodiment. In addition, a pair of caps are provided at opposite ends of the shell. One cap extends from the ribs to the shell, and the other cap joins the ribs in the space within the ribs. The external and internal surfaces of the shell, the ribs and the caps are coated with a conductive material. An insulating portion is then formed on the external surface of the shell as by grinding or masking the conductive coating along this portion so as to form first and second plates of the capacitor. One advantage of this embodiment is tha the effective length of the capacitor is increased because of the contribution of the caps such that the capacitive value of the capacitor becomes correspondingly increased. Another advantage is that the electrical coupling between the different surfaces to define each plate of the capacitor is obtained in a relatively simple manner.

In the drawings:

FIGURE 6 is a front elevational view of a second embodiment of the capacitor, with part of a capacitor being broken away to illustrate certain features in further detail;

FIGURE 7 is an enlarged sectional view substantially on the line 7—7 of FIGURE 6 and particularly illustrates the disposition of the conductive coatings on the different surfaces of the capacitor;

FIGURE 8 is an enlarged side elevational view of the capacitor shown in FIGURE 6 as seen from the right side of FIGURE 6 and particularly illustrates the configuration of a cap provided at a first end of the capacitor;

FIGURE 9 is an enlarged side elevational view of a capacitor shown in FIGURE 6 as seen from the left side of FIGURE 6 and particularly illustrates the configuration of a second cap at the second end of the capacitor;

FIGURE 10 is an enlarged fragmentary rear elevational view of the capacitor shown in FIGURE 6 and particularly illustrates a portion of the capacitor in which the conductive coating is removed to form the two plates of the capacitor;

FIGURE 11 is a front elevational view similar to that shown in FIGURE 6 and illustrates the disposition in a chassis socket of the capacitor shown in FIGURE 6;

FIGURE 12 is a sectional view illustrating the construction of a modified form of the embodiment shown in FIGURES 6 to 11, inclusive;

Figure 1:
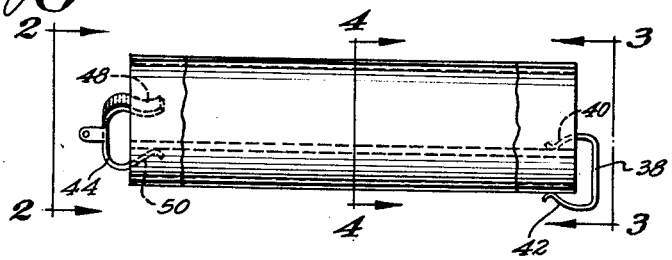
FIGURE 1 is a front elevational view of one embodiment of a capacitor constituting this invention and illustrates the relative disposition of a pair of clips which electrically couple appropriate conductive surfaces in the capacitor to form the first and second plates of the capacitor.
Figure 2:
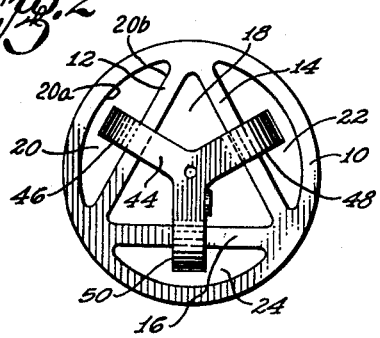
FIGURE 2 is an enlarged side elevational view of the embodiment of the capacitor shown in FIGURE 1 as seen from the left side of the capacitor and illustrates in particular the construction and disposition of a first clip for electrically coupling different conductive surfaces to form one plate of the capacitors.
Figure 3:
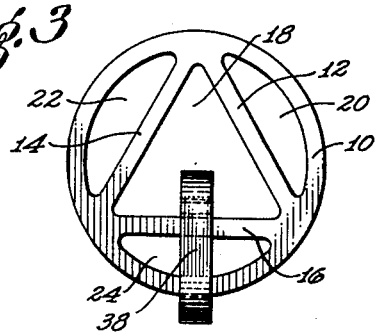
FIGURE 3 is an enlarged side elevational view of the embodiment of the capacitor shown in FIGURE 1 as seen from the right side of the capacitor and particularly illustrates the construction and disposition of a second clip which electrically couples particular conductive surfaces to form a second plate of the capacitor.

FIGURE 13 is a fragmentary sectional view substantially on the line 13—13 of FIGURE 12 and illustrates in further detail the construction of the capacitor shown in FIGURE 12; and FIGURE 14 is a front elevational view on a somewhat schematic basis of a capacitor constituting another embodiment of the invention, with a portion of the capacitor being broken away to illustrate certain features in further detail.

In the embodiment of the invention shown in FIGURES 1 to 5, inclusive, a shell 10 is made from a dielectric material and is preferably provided with an annular configuration. By way of illustration, the shell may have a diameter in the order of ¼ inch to ½ inch, a wall thickness of approximately 0.025 inch and a length in the order of 1 to 3 inches. Preferably, the shell is made from a material such as a ceramic which has a high dielectric coefficient to indicate considerable opposition to the flow of current.

A plurality of ribs such as the ribs 12, 14 and 16 are disposed within the shell 10 along the axial length of the shell. The ribs 12, 14 and 16 may be integral with the shell and may be provided with wall thicknesses corresponding to those of the shell. The ribs 12, 14 and 16 are made from a dielectric material corresponding to that of the shell. Preferably, the ribs 12, 14 and 16 are disposed in transverse relationship to one another to strengthen the shell so that the wall thicknesses of the shell and of the ribs can be minimized. Although only three ribs are shown in the drawings, it should be appreciated that any other number of ribs can be disposed within the shell. The shell 10 and the ribs 12, 14 and 16 can be formed as by extrusion.

As shown in the drawings, the ribs 12, 14 and 16 are disposed in an equilateral triangle so as to define an internal chamber 18 and a plurality of pockets 20, 22 and 24. The internal chamber 18 may have a polygonal shape and the pockets 18, 20 and 22 may have a shape defined partly by an arcuate surface and partly by a planar surface. The pockets 20, 22 and 24 are disposed between the internal chamber 18 and the shell 10. Pairs of the ribs such as the ribs 12 and 14 converge at substantially the position of the shell 10.

The walls of the internal chamber 18 and of the pockets 20, 22 and 24 are coated with a conductive material such as silver or copper and the external surface of the shell 10 is also coated with a similar material. The conductive coating on the external surface of the shell 10 is indicated at 28 in FIGURE 4, and the conductive coatings on the walls of the internal chamber 18 and of the pockets 20, 22 and 24 are respectively indicated at 30, 32, 34 and 36 in FIGURE 4. No conductive coating is provided on the end surfaces of the ribs 12, 14 and 16 and of the shell 10 such as the surfaces shown in FIGURES 2 and 3. In this way, the conductive coatings on the external surface of the shell 10 and on the walls of the internal chamber 18 and of the pockets 20, 22 and 24 are maintained in electrically isolated relationship to one another.

Each of the pockets 20, 22 and 24 has only two walls. For example, the pocket 20 has two walls 20a and 20b. The wall 20a is disposed in contiguous relationship to the external wall 28 of the shell and the wall 20b is disposed in contiguous relationship to the walls of the internal surface 18.

The conductive coating 28 on the external surface of the shell 10 and the conductive coating 30 on the walls of the internal chamber 18 are electrically coupled to define a first plate of the capacitor. This coupling may be obtained by a spring clip 38 (FIGURES 1 and 3) which is preferably made from a conductive material and solder dipped. The clip 38 is provided with two oppositely disposed clamping arms 40 and 42, the clamping arm 40 engaging the conductive coating 30 on walls of the internal chamber 18 and the clamping arm 42 engaging the conductive coating 32 on the external surface of the shell 10.

Similarly, the conductive coatings 32, 34 and 36 on the walls of the pockets 20, 22 and 24 are electrically coupled to define a second plate of the condenser. The walls may be electrically coupled by a spring clip 44 which may be made from a material similar to that of the spring clip 38. The spring clip 44 may be provided with clamping arms 46, 48 and 50 which respectively engage the conductive coatings on the walls of the pockets 20, 22 and 24.

The capacitor formed in the manner described above has certain important advantages. By electrically coupling the conductive coating 30 on the walls of the internal chamber 18 to the conductive coating 28 on the external surface of the shell 10, the first plate of the capacitor is provided with a relatively great length. This length is effectively increased in comparison to the length which is produced by either the conductive coating on the external surface of the shell or on the walls of the internal chamber 18. Similarly, the length of the second plate of the capacitor is effectively increased by electrically coupling the conductive coatings 32, 34 and 36 on the walls of the pockets 20, 22 and 24. Since the capacitive value of a condenser is directly proportional to the length of the plates, the capacitive value of the condenser becomes effectively increased without actually increasing the axial length of the condenser.

The capacitive value of the condenser is also effectively increased because of the disposition of the ribs 12, 14 and 16 within the shell. Since the ribs 12, 14 and 16 have oblique dispositions relative to one another and to the shell, they provide a bracing action against forces which may be exerted externally on the shell to collapse the shell. Because of this, the thickness of the shell 10 and of the ribs 12, 14 and 16 can be decreased considerably below the thickness which would be required of the shell if the ribs were not included. This decrease in thickness of the shell and of the ribs effectively increases the capacitive value of the condenser since the value of a capacitor is inversely proportional to the distance between the two plates of the capacitor.

Since the capacitors produced in accordance with this invention have greater values than corresponding capacitors now in use, the size of the capacitors constituting this invention can be smaller than those now in use in order to obtain a desired value. Because of this reduction in size and diameter, the thickness of the shell 10 and of the ribs 12, 14 and 16 can be reduced even more than would be expected in order to retain the desired strength in the capacitor against external forces. This reduction in the wall thicknesses of the capacitor constituting this invention produces an even greater capacitive value than would ordinarily be expected. Thus, the size of the capacitor can be reduced even further because of the co-operative relationship resulting from the decrease in the size of the condenser and the corresponding decrease in the wall thicknesses of the condenser.

By way of illustration, a capacitor having an external diameter of ¼ inch, a length of 1 inch and a wall thickness of approximately 0.025 inch will have a capacitive value of approximately 0.061 microfarad. The values of the capacitor will be respectively increased to approximately 0.122 and 0.183 microfarad when the axial length of the capacitor becomes increased to 2 inches and 3 inches. Similarly, the capacitor will have a value of approximately 0.121 microfarad for an outer diameter of ½ inch and an axial length of 1 inch. The capacitive value will be effectively doubled and tripled when the axial lengths of the capacitor are respectively doubled and tripled.

The capacitor forming this invention can be inserted in a socket 54 which is formed in a chassis 56 (FIGURE 5) and which is provided with a diameter slightly greater than the external diameter of the shell 10 to provide a close fit of the capacitor in the socket. The socket 54 can be defined by an annular flange 58 extending outwardly from the chassis 56. The conductive coating 28 on the external surface of the shell 10 can then be electrically coupled to the flange 58 by introducing material such as solder between the conductive coating and the flange or can be coupled by a short lead wire or a spring or in any other suitable manner.

In this way, one plate of the capacitor constituting this invention can become effectively grounded to the chassis without requiring that any electrical leads extend from the plate to the chassis. Since no electrical leads are required for such ground connections, stray capacitive and inductive effects are minimized so that the operation of electrical circuits and systems can be predicted with increased accuracy relative to that which now exists in many situations. For example, reduction in stray inductive effects can be especially important when the capacitor is used to provide a by-pass of a signal to ground. Another advantage results from the shield provided by the conductive coating on the external surface of the shell 10 relative to the ungrounded plate formed by the walls of the chambers 20, 22 and 24. This shielding is effective in minimizing undesirable capacitive effects between different circuits and in minimizing the effects of undesirable radiations on the ungrounded plate of the capacitor.

Figure 5:
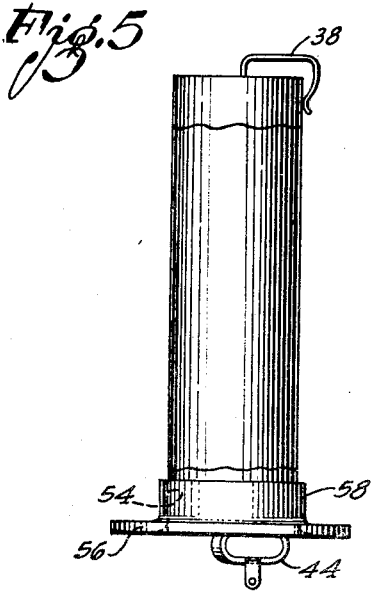
FIGURE 5 is a front elevational view similar to that shown in FIGURE 1 and illustrates the disposition of the capacitor in a chassis socket.
Figure 4:
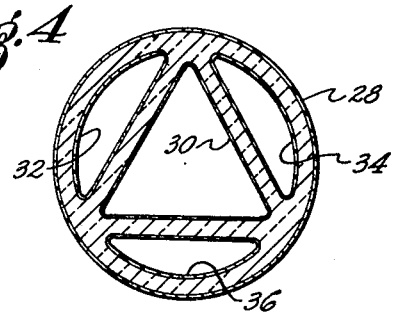
FIGURE 4 is an enlarged sectional view substantially on the line 4—4 of FIGURE 1 and particularly illustrates the disposition of the conductive coatings on the different surfaces of the capacitor.

The capacitors constituting this invention can be manufactured at a cost lower than paper condensers or ceramic condensers now in use when a comparison is made on a given capacitive value for each type of capacitor. This is especially true since the capacitors can be manufactured by machine and on automation principles. This reduction in cost is especially important in such competitive fields as the manufacture of radio or television receivers where profit margins for each receiver are relatively low and where the purchaser is definitely cost conscious. Further reductions in cost can be achieved because of the minimum amount of labor required to install the capacitors in the chassis and to couple one plate of the condenser to the chassis as shown in FIGURE 5. The reduction in cost is achieved even while the performance of the radio and television receivers is improved as a result of the minimizing of stray inductances and capacitances in the receivers. Furthermore, reductions in size of the electrical equipment such as radio or television receivers can be simultaneously achieved because of the reduction in size of the capacitors constituting this invention in comparison to the size of paper condensers.

As used in the claims, the term "electrically isolate" indicates that one surface is separated electrically from a second surface by the disposition of a third surface between the first and second surfaces. For example, the pockets 20, 22 and 24 are electrically isolated from one another by the disposition of the internal surface 18 between them. Similarly, the external surface 28 is electrically isolated from the walls of the internal surface 18 by the disposition of the pockets 20, 22 and 24 between them.

The method of forming the capacitor shown in FIGURES 1 to 5, inclusive, is as follows. The shell 10 and the ribs 12, 14 and 16 are first formed, preferably on an integral basis, and are then coated with conductive material such that the conductive coatings on the shell and on the ribs are electrically isolated from one another. The conductive coatings on the external surface of the shell 10 and on the walls of the internal chamber 18 are then electrically coupled as by the clip 38, and the conductive coatings on the walls of the pockets 20, 22 and 24 between the ribs and the shell are coupled as by the clip 44. The capacitor may then be inserted in the chassis socket 54 and the conductive coating on the shell 10 may be coupled electrically to the chassis 56.

A second embodiment of the ceramic capacitor is shown in FIGURES 6 to 11, inclusive. In this embodiment the capacitor is provided with a shell 10 and with ribs 12, 14 and 16 in a manner similar to that described above and shown in FIGURES 1 to 5, inclusive. The ribs 12, 14 and 16 are disposed relative to one another and to the shell to define an internal chamber 18 and a plurality of pockets 20, 22 and 24 in a manner similar to that described above and shown in FIGURES 1 to 5, inclusive. However, the embodiment shown in FIGURES 6 to 11, inclusive, has a pair of caps each disposed at a different longitudinal end of the shell. Each of the caps is made from an insulating material such as a ceramic and is preferably disposed in integral relationship with the shell 10 and the ribs 12, 14 and 16.

A first cap 60 (FIGURE 8) extends between the shell 10 and the ribs 12, 14 and 16 so as to close the portion of the capacitor between the ribs and the shell without closing the portion of the capacitor within the ribs. A second cap 62 (FIGURE 9) is disposed at the end of the shell opposite to the cap 60 and is provided with a configuration to cover the internal portion of the capacitor between the ribs 12, 14 and 16 without covering the portion of the capacitor between the ribs and the shell 10. The caps 60 and 62 are coated on their external and internal surfaces with conductive material corresponding to the conductive material coating the shell 10 and the ribs 12, 14 and 16.

As best seen at 64 in FIGURE 10, the conductive coating is removed or masked around the complete periphery of the shell 10 at a position near the cap 62. The conductive coating may be removed from the portion 64 and may be removed manually or by machine as by grinding or may be masked without being removed. For example, when the axial length of the shell 10 is approximately 1 inch long, the length of the insulating portion 64 can be approximately $\frac{1}{16}$ inch to ⅛ inch long. By providing the insulating portion 64, the two plates of the capacitor are formed. One plate is defined in part by the external surface of the shell 10, the external surface of the cap 60 and the internal surfaces of the ribs 12, 14 and 16 which define the internal chamber 18. The first plate of the capacitor also includes the internal surface of the cap 62. The second plate of the capacitor is defined by the walls of the pockets 20, 22 and 24, the external surface of the cap 62 and the internal surface of the cap 60.

The capacitor shown in FIGURES 6 to 11, inclusive, has all of the advantages discussed above for the embodiment shown in FIGURES 1 to 5, inclusive, and also has certain other advantages. One advantage results from the increased capacitive value which is obtained for a given axial length of the shell 10 as a result of the inclusion of the caps 60 and 62 and the conductive coating on these caps. For example, the external surface of the cap 60 forms a part of one plate of the capacitor and the internal surface forms a part of the second plate. Similarly, the external surface of the cap 62 forms a part of the second plate of the capacitor and the internal surface of the cap forms a part of the first plate. Because of the inclusion of these surfaces, the effective length of the capacitor is increased without actually increasing the axial lengths. Since the value of a capacitor is almost directly proportional to the length of the capacitor, the capacitive value of the capacitor becomes increased for a given axial length.

The capacitor shown in FIGURES 6 to 11, inclusive, has another important advantage. This results from the requirement that only one external connector be provided for the capacitance. This may be seen from FIGURE 11, which illustrates the disposition of the capacitor in the chassis socket 54. As will be seen, the first plate of the capacitor is electrically coupled to the chassis 56 by inserting the capacitor in the chassis 54 and by providing an electrical connection as by soldering between the shell 10 and the chassis. A connection to the second plate of the capacitor may be conveniently provided by attaching a connector 68 to the conductive coating on the external surface of the cap 62. The attachment between the connector 68 and the second plate of the capacitor can be directly made because of the conductive coating provided on the external surface of the cap 62. The connector 68 may be provided with a socket 70 to receive a suitable electrical lead.

The capacitor described above and shown in FIGURES 6 to 11, inclusive, may be formed in the following manner. The shell 10, the ribs 12, 14 and 16 and the caps 60 and 62 may be formed manually or by machine and are preferably provided with an integral construction. All of the resultant surfaces are coated with a conductive material and the connector 68 is attached to the conductive coating on the external surface of the cap 62. The conductive coating on the external portion 64 of the shell 10 is then removed as by grinding or is masked to form the first and second plates of the capacitor.

FIGURES 12 and 13 illustrate a modification of the embodiment shown in FIGURES 6 to 11, inclusive. This modification is provided when neither of the two plates of the capacitor is to be grounded to the chassis 54. Under such circumstances, the axial length of the insulating portion 64 on the external surface of the shell 10 may be increased and an insulating sleeve 80 may be disposed on the insulating portion 64 of the shell. The insulating sleeve 80 may be provided with a conductive coating 82 on its outer annular surface so that the sleeve may be mechanically bonded to the chassis 56 as by solder. By providing the sleeve 80, the valve of the capacitance produced between the flange 58 on the chassis 56 and the plates of the capacitor is minimized. Minimizing this capacitive value is important in order to obtain an optimum operation of the circuits in which the capacitor may be included. The reason is that this capacitive value constitutes a distributed capacitance which may prevent the operation of a circuit from being accurately predicted or from being reliably repeated in production. Although the embodiment shown in FIGURES 12 and 13 constitutes a modification of the embodiment shown in FIGURES 6 to 11, inclusive, it should be appreciated that similar modifications can be made in the embodiment shown in FIGURES 1 to 5, inclusive.

Instead of electrically grounding one plate of the capacitor to the chassis as shown in FIGURES 5 to 11, it may be desired to maintain both plates of the capacitor at potentials different from ground. One way of accomplishing this is to encase the capacitor within a dielectric material such as a plastic material. A resultant capacitor is shown in FIGURE 14, at least for the embodiment shown in FIGURES 6 to 11, inclusive, and similar modifications may be made in the capacitor shown in FIGURES 1 to 5, inclusive. As will be seen, the capacitor shown in FIGURE 14 is enclosed within a dielectric casing 90 which may be a tube or sleeve. The casing 90 may be molded on the capacitor or otherwise tightly fitted on the capacitor.

The connector 68 extends outwardly from one end of the capacitor, and a lead 92 extends outwardly from the other end of the capacitor, preferably in an axial direction. The lead 92 is connected to the cap 60 so as to provide a connection to the first plate of the capacitor just as the connector 68 provides an electrical coupling to the second plate of the capacitor. As previously described, a lead may also be connected to the connector by inserting it in the socket 70 and soldering it to the connector.

The capacitor shown in FIGURES 6 to 11, inclusive, and described above may be produced in an optimum manner by a method which will now be described. As a first step, the shell 10 and the ribs 12, 14 and 16 can be formed as by extrusion. The caps 60 and 62 may then be formed as on a rotary ceramic press. The caps 60 and 62 are then fitted into the ends of the extrusion and the resultant article is fired at a suitable temperature such as a temperature in the order of 2000° F. to fuse into a unitary structure the caps 60 and 62 and the extrusion formed by the shell 60 and the ribs 12, 14 and 16. The conductive coating is subsequently applied to the unitary structure to produce the capacitor shown in FIGURES 6 to 11, inclusive, and described above. The conductive coating may be applied to the unitary structure by a single dipping operation or by an operation such as spraying.

It should be appreciated that the pockets such as the pockets 20, 22 and 24 in FIGURES 1 to 6, inclusive, are disposed in a particular relationship to the walls of the internal chamber 18 and the external walls of the shell 10. This relationship is such that the walls of the pockets 20, 22 and 24 are disposed in capacitively coupled relationship to the walls of the internal chamber 18 and the external walls of the shell 10 along the full surface areas of the walls of the pockets 20, 22 and 24. Conversely, the walls of the internal chamber 18 and the external walls of the shell 10 are disposed in contiguous relationship to the walls of the pockets 20, 22 and 24 along the full lengths of the walls of the external chamber 18 and the external walls of the shell 10.

It should also be appreciated that the shell 10 may have any other configuration than the cylindrical configuration shown in the drawings. For example, the shell may be disposed in a looped configuration which is neither cylindrical nor elliptical. This looped configuration of the shell 10 may have an endless relationship. It should also be appreciated that the ribs such as the ribs 12, 14 and 16 do not necessarily require a linear configuration. Furthermore, when the internal chamber 18 defines a polygon, the polygon does not necessarily have to be formed from linear sides such as those formed by the ribs 12, 14 and 16.

As one possibility, the extrusion and the end caps 60 and 62 may all be formed of the same material. It is also possible to form the end caps 60 and 62 from a different material than the extrusion defined by the shell 10 and the ribs 12, 14 and 16. Forming the end caps 60 and 62 from a different material than the extrusion may be desirable in order to obtain optimum bond between the end caps and the extrusion during the cooling period after the firing of these components.

Although this invention has been disclosed and illustrated with reference to particular applications, the principles involved are susceptible of numerous other applications which will be apparent to persons skilled in the art.

The invention is, therefore, to be limited only as indicated by the scope of the appended claims.

What is claimed is:

1. A capacitor, including, a shell made from electrically insulating material and provided with an external surface, a plurality of ribs made from electrically insulating material and disposed within the shell in integral relationship to the shell and in particular relationship to define a first continuous internal surface and a plurality of isolated continuous internal surfaces disposed in spaced relationship to one another, there being at one end a first cap made from electrically insulating material and having an external surface and an internal surface and extending only from the first internal surface to the external surface of the shell and there being at the other end a second cap made from electrically insulating material and having an external surface and an internal surface and extending only between the plurality of isolated internal surfaces, the external surface of the shell and the first continuous internal surface and the plurality of isolated internal surfaces and the external and internal surfaces of the first and second caps being coated with a conductive material and there being a gap in the conductive coating at a single position for the formation of a first plate of the capacitor by the external surface of the shell, the first internal surface and the external surface of the first cap and for the formation of a second plate of the capacitor by the external surface of the second cap and the plurality of isolated internal surfaces, the plurality of isolated internal surfaces being disposed relative to the external surface of the shell and the first continuous internal surface to produce a capacitive effect between the isolated internal surfaces and the full area of the external surface of the shell and between the isolated internal surfaces and the full area of the first continuous internal surface.

2. A capacitor, including, a shell made from an electrically insulating material and having an external surface and a conductive coating extending along the length of the surface, a plurality of ribs extending in transverse relationship to one another to define a first continuous internal surface and to define a plurality of pockets between the ribs and the shell wherein each pocket has a continuous internal surface, a first cap at one end and having an internal surface and an external surface and extending only between the ribs and the external surface of the shell to couple the first continuous internal surface and the external surface of the shell, a second cap at the opposite end and having an internal surface and an external surface and extending only between the ribs to couple the continuous internal surfaces defining the pockets, the first continuous surface and the continuous internal surfaces defining the pockets and the external surfaces of the first and second caps being provided with a conductive coating and being disposed in electrically isolated relationship and there being a single gap in the conductive coating at a particular position on one of the surfaces to form in the capacitor a first plate including the external surface of the shell, the first continuous internal shell surface and the external surface of the first cap and to form in the capacitor a second plate including the external surface of the second cap and the continuous internal surfaces defining the pockets, different pairs of ribs in the plurality being disposed relative to each other to intersect at substantially the position of the shell.

3. A capacitor, including, a shell made from electrically insulating material and having an external surface and disposed in a substantially closed configuration in cross section, the shell being provided with a plurality of internal ribs made from electrically insulating material and integral with the shell and with one another to define a polygon within the shell and a plurality of pockets between the polygon and the external surface of the shell, the shell being further provided at one end with a first cap made from insulating material and having an external surface and an internal surface and covering the space between the walls of the polygon and the external surface of the shell and being further provided at the other end with a second cap made from insulating material and having an external surface and an internal surface and covering the space within the walls of the polygon, the external surface of the shell, the walls of the internal polygon and the walls of the pockets and the external surfaces of the first and second caps being coated with a conductive material and there being an insulating portion extending around the periphery of the external surface of the shell to form a first plate of the capacitor including the external surface of the shell, the internal walls of the polygon and the external surface of the first cap and to form a second plate of the capacitor including the walls of the pockets and the external surface of the second cap, the pockets in the plurality being disposed relative to the external surface and the polygon of the shell to produce a capacitive effect between the pockets and the full area of the external surface of the shell and the full surface area of the polygon.

4. The capacitor set forth in claim 1 in which the internal surfaces of the first and second caps are coated with conductive material and in which the internal surface of the second cap is included in the first plate and in which the internal surface of the first cap is included in the second plate.

5. The capacitor set forth in claim 3 in which the ribs are disposed in pairs with each pair converging at substantially the surface of the shell.

6. In a capacitor, a shell made from electrically insulating material and having an external surface and an internal surface and disposed in a substantially closed configuration in cross section, and a pair of ribs disposed in the shell and made from an insulating material and converging at substantially the position of the shell and defining an internal pocket surface and defining a pair of further pocket surfaces with the internal pocket surface of the shell, each of the further pocket surfaces in the pair having only first and second walls, the external surface and the internal surface of the shell and the walls of the pair of ribs being coated with an electrically conductive material, the internal pocket surface and the external surface of the shell being electrically coupled to define a first plate of the capacitor and the first and second walls of the pair of pocket surfaces being electrically coupled to define a second plate of the capacitor.

7. In a capacitor, a shell made from electrically insulating material and having an external surface and an internal surface and disposed in a substantially closed configuration in cross section, and a pair of ribs made from electrically insulating material and disposed in the shell relative to each other to define a pair of isolated pockets and an internal pocket between the isolated pockets to provide an electrical isolation of the isolated pockets from each other by the disposition of the internal pocket relative to the isolated pockets and to provide an electrical isolation of the external surface of the shell from the internal pocket by the disposition of the isolated pockets relative to the external surface and the internal pocket, the external and internal surfaces of the shell and the pair of ribs being coated with an electrically conductive material, means electrically coupling the external surface of the shell and the surfaces of the ribs adjacent the internal pocket to define a first plate of the capacitor, and means electrically coupling the surfaces of the ribs adjacent the isolated pockets to define a second plate of the capacitor.

8. A capacitor, including, a shell made from electrically insulating material and having an external surface and an internal surface and disposed in a substantially closed configuration in cross section, a plurality of ribs made from an electrically insulating material and having surfaces disposed in the shell relative to one another to define a plurality of pockets and to define a first continuous internal surface between the pockets for electrically isolating the pockets in the plurality from one another along the lengths of the pockets by the disposition of the first continuous internal surface and for electrically isolating the external surface and the first continuous internal surface along the lengths of these surfaces by the disposition of the pockets, there being an electrically conductive coating on the external surface and the internal surface of the shell and on the surfaces defining the ribs, means electrically coupling the external surface of the shell and the surfaces of the ribs defining the first continuous internal surface to form a first plate of the capacitor, and means electrically coupling the surfaces defining the pockets to form a second plate of the capacitor.

9. A capacitor, including,
   a shell made from an electrically insulating material and having an outer surface and a conductive coating extending along the length of the surface,
   a plurality of ribs extending in oblique relationship to one another to define a first continuous internal surface and a plurality of pockets each having a continuous internal surface and each defined by only first and second walls,
   the first walls of the internal surfaces in the plurality of pockets being disposed in contiguous relationship to the complete outer surface of the shell along the complete length of the first walls of the first continuous internal surface,
   the second walls of the internal surfaces in the plurality of pockets being disposed in contiguous relationship to the first continuous internal surface along the complete length of the second walls of the first continuous internal surface,
   the first continuous surface and the internal surfaces in the pockets being provided with a conductive coating and being disposed in electrically isolated relationship to one another,
   there being an electrical coupling between the first and second walls of the internal surfaces in all of the pockets to define a first plate of the capacitor,
   and there being an electrical coupling between the first internal surface and the outer surface of the shell to define a second plate of the capacitor.

10. A capacitor, including,
    a shell made from electrically insulating material and having an outer surface disposed in substantially a closed configuration in cross section,
    the shell being provided with a plurality of internal ribs made from electrically insulating material and integral with the shell and with one another to define a polygon within the shell and a plurality of pockets between the polygon and the outer surface of the shell,
    the plurality of pockets having only first and second walls,
    the first walls of the pockets being disposed in contiguous relationship to the outer surface of the shell along the complete periphery of the outer surface of the shell and the second walls of the pockets being disposed in contiguous relationship to the internal polygon along the complete surface of the internal polygon, the outer surface, the walls of the internal polygon and the first and second walls of the pockets being coated with a conductive material,
    there being an electrical coupling between the polygon and the outer surface of the shell to define a first plate of the capacitor, and
    there being an electrical coupling between the first and second walls of all of the different pockets in the shell to define a second plate of the capacitor.

11. A capacitor, including,
    a shell made from electrically insulated material and disposed in a substantially closed configuration in cross section and provided with an external surface and provided with a plurality of ribs integral with the shell and disposed relative to one another, the external surface and a particular one of the pockets being electrically isolated from each other along their lengths by the other pockets in the plurality and the other pockets in the plurality being electrically isolated from one another by the particular pocket in the plurality to define a plurality of pockets each having a substantially closed configuration in cross section,
    the external surface and the pockets being coated with an electrically conductive material to make the surface and the pockets electrically conductive but to retain the surface and the pockets in electrically isolated relationship to one another,
    the external surface and a particular one of the pockets being electrically isolated from each other along their lengths by the other pockets in the plurality and the other pockets in the plurality being electrically isolated from one another along their lengths by the particular pocket in the plurality,
    a first conductive clip electrically connecting at least the particular one of the pockets in the plurality and the external surface to form one plate of the capacitor, and a second conductive clip electrically connecting the other pockets in the plurality to form the other plate of the capacitor,
    the other pockets in the plurality being disposed in contiguous relationship to the external surface of the shell along substantially the complete length of the closed configuration defining the external surface and the other pockets in the plurality being disposed in substantially contiguous relationship to the particular one of the pockets in the plurality along substantially the complete length of the closed configuration defining the particular pocket in the plurality.

12. A capacitor, including,
    a shell made from electrically insulating material and having an external surface and disposed in a substantially closed configuration in cross section and provided with a plurality of internal ribs made from electrically insulating material and integral with the shell and with one another to define a polygon within the shell and to define between the polygon and the outer surface of the shell a plurality of pockets each having only first and second walls defining the polygon,
    the pockets and the external surface being coated with a conductive material to be in electrically isolated relationship with one another,
    a first conductive clip connected between the polygon and the external surface to form a first plate of the capacitor, and a second conductive clip connected between the different pockets to form a second plate of the capacitor,
    the different pockets in the plurality being disposed in electrically isolated relationship from one another between the polygon and the external surface of the shell by the disposition of the polygon relative to the pockets to produce a capacitive effect between the different pockets in the plurality and the external surface of the shell and between the pockets in the plurality and the polygon along substantially the complete surface of the different pockets in the plurality.

13. In a capacitor,
    a shell made from electrically insulating material and having an external surface with a substantially closed configuration in cross section and having a plurality of ribs meeting in pairs at the external surface to define an internal surface with a substantially closed configuration in cross section,
    the external surface and the internal surface being coated with a conductive material, there being an electrical coupling between the conductive coatings on the external surface and on the internal surface to form one plate of the capacitor, the plurality of ribs being disposed relative to the external surface to electrically isolate the external surface from the internal surface.

14. In a capacitor,
a shell made from electrically insulating material and having an external surface disposed in a substantially closed configuration in cross section and provided with a plurality of linearly disposed internal ribs which are integral with the shell and which are disposed relative to one another to define at least one internal surface disposed in a substantially closed configuration in cross section,
the external surface and the internal surface having conductive coatings along substantially their full lengths to retain the surfaces in electrically isolated relationship to each other,
and an electrically conductive clip extending between the internal surface and the external surface to define one plate of the capacitor,
the ribs being disposed between the external surface of the shell and the internal surface along the full length of the external surface and the internal surface to electrically isolate the external surface and the internal surface along substantially the full length of the closed configurations of the external and internal surfaces.

15. In a capacitor,
a shell made from electrically insulating material and having an external surface and a plurality of ribs defining an internal surface and having a cap defined by an external surface and an internal surface and extending at one end only between the external surface and the ribs in integral relationship with the shell and the ribs,
the external surface of the shell and the internal surface and the external surface of the cap being coated with a conductive material to form one plate of the capacitor,
the ribs being disposed between the external surface and the internal surface at every position on the external surface and the internal surface to electrically isolate the external surface and the internal surface at every position.

References Cited by the Examiner

UNITED STATES PATENTS

| | | | |
|---|---|---|---|
| 2,702,878 | 2/55 | Heibel | 317—242 |
| 2,793,333 | 5/57 | Ehlers | 317—242 |

FOREIGN PATENTS

| | | |
|---|---|---|
| 688,417 | 2/40 | Germany. |
| 482,459 | 3/38 | Great Britain. |
| 523,869 | 7/40 | Great Britain. |

JOHN F. BURNS, *Primary Examiner.*

LLOYD McCOLLUM, WALTER L. CARLSON, E. JAMES SAX, *Examiners.*